C. P. CROSSMAN

Caster-Bottles.

Reissued Aug. 18, 1874.

No. 6,015.

Witnesses
Otis T. Garey.
He. E. Metcalf.

Inventor
Charles P. Crossman.
By C. A. Shaw.
Atty.

THE GRAPHIC CO. PHOTO-LITH. 39 & 41 PARK PLACE, N.Y.

UNITED STATES PATENT OFFICE.

CHARLES P. CROSSMAN, OF WEST WARREN, MASSACHUSETTS.

IMPROVEMENT IN CASTER-BOTTLES.

Specification forming part of Letters Patent No. 39,889, dated September 15, 1863; reissue No. 6,015, dated August 18, 1874; application filed April 25, 1874.

*To all whom it may concern:*

Be it known that I, CHARLES P. CROSSMAN, of West Warren, in the county of Worcester, State of Massachusetts, have invented a certain new and useful Improvement in Salt Boxes or Casters, of which the following is a description sufficiently full, clear, and exact to enable any person skilled in the art or science to which my invention appertains to make and use the same, reference being had to the accompanying drawing, forming a part of this specification, in which—

Figure 1:
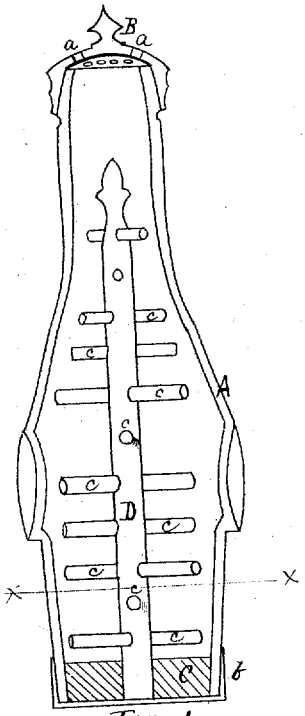
Figure 2:
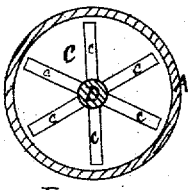

Figure 1 is a vertical section, showing my invention, and Fig. 2 a transverse section of the same taken on the line *x x*, Fig. 1.

Like letters of reference indicate corresponding parts in the different figures of the drawing.

The object of my invention is to break up the lumps of salt which form in a salt-box or caster-bottle, and clog up the perforations in the cover of the same, and also to prevent the formation of such lumps. To this end I employ a pulverizer, composed of a substance harder than the salt, disposed and used within the body of the box or bottle in such a manner that, when the same is shaken, the salt will be brought into contact with the pulverizer, and broken up or pulverized, and thus a free discharge through the openings in the cover be insured.

The extreme simplicity of my invention renders an elaborate description unnecessary.

In the drawing, A represents a salt-box or caster-bottle, made of glass or any suitable material, and provided with the cover B, which is perforated with a series of holes, *a a*. The bottom of the box is formed by a piece of cork, C, which is or may be held in place by a cap, *b*. From the center of the bottom C rises a stem, D, provided with a series of arms, *c c*, which extend transversely through the stem, in various directions, nearly to the inner surface of the box.

The pulverizer D *c c* may be made in a great variety of forms, and produce the same general results.

The central stem may be attached to the cover instead of to the bottom of the box, and the arms, instead of being disposed in the stem, may be attached to the sides of the box, or wires may be stretched across the body of the box to take the place of the arms, without departing from the spirit of my invention, the distinguishing feature of which is a mechanism or means introduced and used within the body of a salt-box or caster-bottle having a perforated cover, in such a manner as to pulverize the salt by the act of shaking the box or bottle, and thus promote the discharge of the same through the cover.

It will be obvious that my improvement is equally applicable to pepper boxes or casters, and to all other boxes used for containing a substance in powder which has a tendency to form into lumps or to "pack," from a dampness or any other cause, and which has to be discharged through a perforated cover.

I am aware that in the Letters Patent granted to one Clawson, December 21, 1858, and numbered 22,349, a pepper-box is described which is provided with a cylindrical clearing-brush disposed close to the apertures in the cap of the box, in such a manner that by turning the shaft of the brush, which projects through the side of the cap, the pepper will be sifted or rubbed through the apertures when the box is inverted; but such a device is essentially different from my invention, as it will not pulverize the contents of the bottle or box when the cap is uppermost, nor by the mere act of shaking the bottle, and in its use the bottle is required to be held in an inverted position in one hand, while the brush is turned with the other, thus employing both hands, while my pulverizer acts to pulverize the contents of the bottle when the bottle is shaken, without regard to the position in which it is held, one hand only being required in the operation. I therefore do not herein claim anything shown or described in said Letters Patent, when in and of itself considered; but

Having thus described my invention, what I claim is—

The combination, with a salt-box having a perforated cover, of a pulverizer arranged or disposed within the box to pulverize the salt contained therein, by the mere act of shaking the box in whatever position the same may be placed, substantially as specified.

CHAS. P. CROSSMAN.

Witnesses:
C. C. BROWN,
JOS. F. HITCHCOCK.